US008923133B2

(12) United States Patent
Dade et al.

(10) Patent No.: US 8,923,133 B2
(45) Date of Patent: Dec. 30, 2014

(54) DETECTION OF UNAUTHORIZED CHANGES TO AN ADDRESS RESOLUTION PROTOCOL CACHE IN A COMMUNICATION NETWORK

(75) Inventors: Nicholas S. Dade, Santa Cruz, CA (US); Soren K. Lundsgaard, Inverness, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 1038 days.

(21) Appl. No.: 12/978,927

(22) Filed: Dec. 27, 2010

(65) Prior Publication Data

US 2012/0163182 A1    Jun. 28, 2012

(51) Int. Cl.
*H04W 4/00* (2009.01)
*H04L 12/28* (2006.01)
*H04L 12/56* (2006.01)
*H04L 29/06* (2006.01)

(52) U.S. Cl.
CPC .................. *H04L 63/1441* (2013.01)
USPC ........... 370/241; 370/389; 370/392; 370/315; 370/328; 370/338

(58) Field of Classification Search
USPC ........................................................ 370/241
See application file for complete search history.

(56) References Cited

U.S. PATENT DOCUMENTS

| | | | | |
|---|---|---|---|---|
| 2002/0013844 A1* | 1/2002 | Garrett et al. | ................. | 709/229 |
| 2002/0029280 A1* | 3/2002 | Holden et al. | ................. | 709/229 |
| 2002/0035635 A1* | 3/2002 | Holden et al. | ................. | 709/230 |
| 2002/0122412 A1* | 9/2002 | Chen et al. | ..................... | 370/349 |
| 2002/0150089 A1* | 10/2002 | Stanton et al. | ................ | 370/389 |
| 2003/0165160 A1* | 9/2003 | Minami et al. | ................ | 370/241 |
| 2004/0052216 A1* | 3/2004 | Roh | ............................... | 370/252 |
| 2004/0156318 A1* | 8/2004 | Rune et al. | ..................... | 370/235 |
| 2004/0190477 A1* | 9/2004 | Olson et al. | ................... | 370/338 |
| 2005/0025157 A1* | 2/2005 | Pennec et al. | ............. | 370/395.5 |
| 2005/0122921 A1* | 6/2005 | Seo | .............................. | 370/310 |
| 2005/0180429 A1* | 8/2005 | Ghahremani et al. | ... | 370/395.21 |
| 2005/0180439 A1* | 8/2005 | Kondo et al. | ................. | 370/401 |
| 2006/0010318 A1* | 1/2006 | Coley et al. | .................... | 713/150 |
| 2006/0248229 A1* | 11/2006 | Saunderson et al. | .......... | 709/245 |
| 2006/0274752 A1* | 12/2006 | Jain et al. | ...................... | 370/392 |
| 2007/0070998 A1* | 3/2007 | Sethuram et al. | ............. | 370/389 |
| 2007/0121634 A1* | 5/2007 | Anderson | ..................... | 370/392 |
| 2008/0101381 A1* | 5/2008 | Sun et al. | ................. | 370/395.54 |
| 2008/0144532 A1* | 6/2008 | Chamarajanagar et al. | .. | 370/255 |
| 2008/0225770 A1* | 9/2008 | Cho et al. | ....................... | 370/312 |
| 2008/0273531 A1* | 11/2008 | Johnson et al. | ............... | 370/390 |
| 2011/0211580 A1* | 9/2011 | Hanai | ............................ | 370/392 |

OTHER PUBLICATIONS

Md Sohail Ahmed—WPA TOO—"Hole 196"—AirTigflt Networks—Copyright 2007 IEEE—36 pages.

* cited by examiner

*Primary Examiner* — Ian N Moore
*Assistant Examiner* — Jenee Williams

(57) ABSTRACT

A method and apparatus for detecting an unauthorized change in an Address Resolution Protocol (ARP) cache in a communication network includes a step of establishing an authorized ARP cache. Another step includes examining packets from a terminal for a destination address. Another step includes determining if the destination address is incorrect by using the authorized ARP cache.

16 Claims, 2 Drawing Sheets

DETECTION OF UNAUTHORIZED CHANGES TO AN ADDRESS RESOLUTION PROTOCOL CACHE IN A COMMUNICATION NETWORK

FIELD OF THE DISCLOSURE

The present invention relates generally to communication networks and more particularly to detection of unauthorized changes to an Address Resolution Protocol cache in a communication network.

BACKGROUND

A problem that is arising in communication networks, such as an IEEE 802.11 i Wi-Fi (wireless fidelity) network, is the ease with which access can be obtained to a these communication networks. For example, an unauthorized or "rogue" terminal or access point could be added to a network without having authorization to do so by spoofing a Media Access Control (MAC) address. In this case, this unauthorized user, or anyone in proximity to the "rogue" access point, could access (i.e. snoop) the network for illicit purposes. Of course, such unauthorized access poses a security threat to the communication network.

Wi-Fi Protected Access (WPA) and later WPA2 was introduced to address this problem. In particular, WPA and WPA2 uses pairwise transient key (PTK) support shared between stations to detect MAC address spoofing and data forgery by binding the addresses of the stations to the pairwise key. However, there is still a flaw in the WAP2 system, referred to as the "Hole 196" flaw, for group communications, such as multicast and broadcast traffic, which uses only a single group (temporal) key (GTK). In this case, an unauthorized user can inject their own data into a packet to a client by spoofing the group key. For example, an unauthorized user can inject faked Address Resolution Protocol (ARP) information in an encrypted group-addressed message to a victim (i.e. ARP poisoning), which indicates that the unauthorized user's address (or other false address) is now to be used as the client's gateway address. The faked ARP information makes the victim change their ARP cache to include the faked gateway address (of the unauthorized user), which results in the victim sending data packets to the unauthorized user, or anyone else the unauthorized user has indicated in the faked ARP gateway address.

One solution to this problem is for the network operator to use a randomly generated GTK at periodic time intervals. However, the unauthorized user will still be able to access the network during the time when any one particular GTK is in use. Another solution is to convert group traffic to pairwise (unicast) traffic. However, this requires a significant amount of messaging overhead, which defeats the purpose of group communications in the first place. Another solution is to install specialized security software on each client. However, this has extra cost.

Accordingly, there is a need for a technique to detect an unauthorized change in an ARP cache in a communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
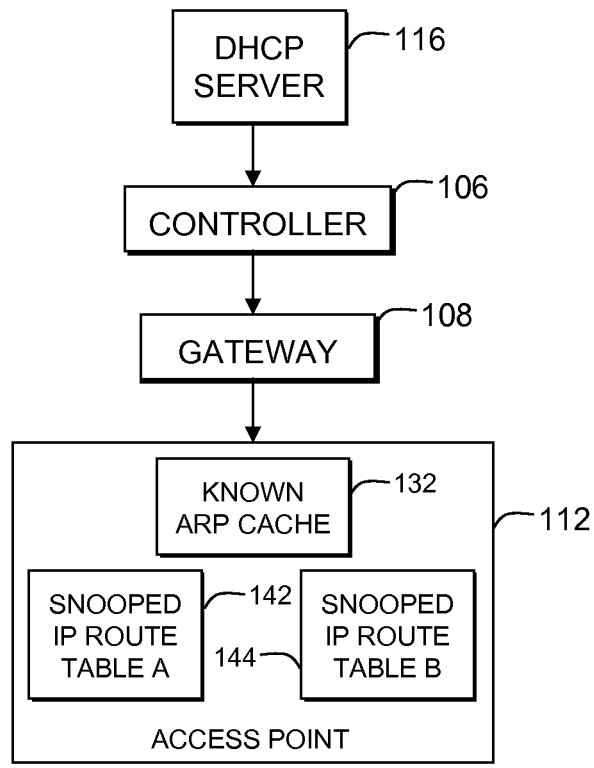
FIG. 1 is a simplified block diagram of a system, in accordance with some embodiments of the present invention.
Figure 1:
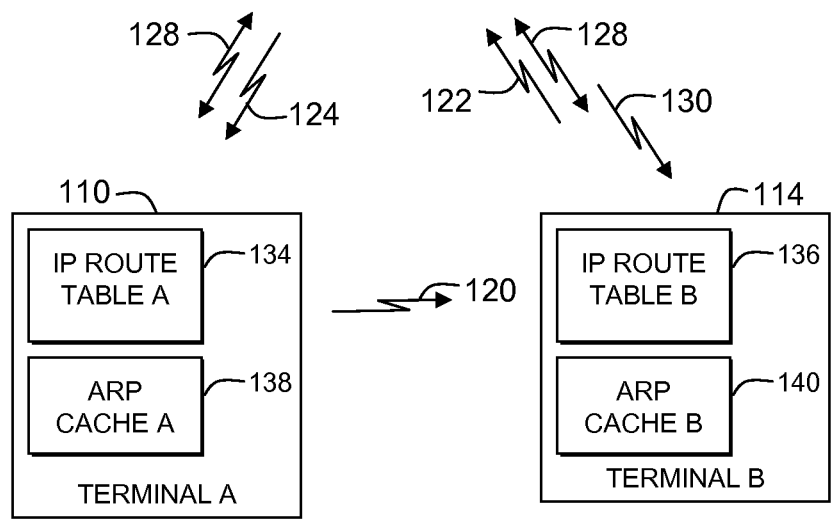

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus and method is described that detects an unauthorized change in an ARP cache in a wired or wireless communication network. In particular, the present invention has a network entity examine every packet from a client and compare a destination IP/MAC address tuple with a known good tuple in order to detect ARP cache poisoning. The problem can be detected (to provide a security alert), mitigated by counter-poisoning the ARP cache of the infected client, or corrected by replacing the address used by the infected client.

The wireless communication network as describes herein can include not only a wide-area network, such as Wi-Fi, but also local area networks, or other IEEE 802.11 wireless communication systems. However, it should be recognized that the present invention is also applicable to other wired or wireless communication systems modified to implement embodiments of the present invention.

FIG. 1 is a block diagram depiction of a system in accordance with the present invention. A plurality of network entities are shown, which can support a wired or wireless communication network, such as an IEEE 802.11i Wi-Fi network for example. The network entities can include a controller 106 that controls one or more wireless access points 112 through a gateway 108, connected in wired and/or wireless configurations. A DHCP server 116 can provide information for Internet connectivity. Access terminals 110, 114 can be present which attach themselves with the access point 112, while the controller control communications with the terminals through the access point(s). The protocols and messaging needed to establish a wired and wireless communication network are known in the art and will not be presented here for the sake of brevity.

In FIG. 1, there is shown a block diagram of various entities adapted to support the inventive concepts of the embodiments of the present invention. Those skilled in the art will recognize that FIG. 1 does not depict all of the equipment necessary for network to operate but only those network components and logical entities particularly relevant to the description of embodiments herein. For example, controllers, access points, and access terminals can all includes separate processors, communication interfaces, transceivers, memories, etc. In general, components such as processors, memories, and interfaces are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Referring back to FIG. 1, a network entity is provided for detecting an unauthorized change in an Address Resolution Protocol (ARP) cache of a terminal under its control in a communication network, in accordance with the present invention. As used herein, the network entity is an access point 112. However, it should be recognized that the network entity could be any other entity in the network including the gateway 108, the controller 106, or other entity. The terminals 114 are configured with IP routing tables 136 by the associated access point 112. In practice, the terminals often are configured with identical IP route tables, but in the general case this is not necessary.

In the example shown, an unauthorized or rogue terminal A 110 has attached itself to the access point 112. Both terminal A 110 and terminal B 114, which is an authorized terminal, can communicate 128 with the attached access point 112 using their own individual private pairwise key to encrypt their individual traffic streams with the access point 112. The access point also provides to all its attached terminals, including the rogue terminal 110, a group key which is the same for all the terminals, and which can be used for broadcasts to the terminals. The group key is always known to the attached terminals.

The illicit terminal A 110 can send a broadcast frame 120 that is encrypted with the group key directly to other terminals (e.g. terminal B 114) within its broadcast range, bypassing the access point 112. In this way the network never knows that such a frame has been sent. This broadcast frame 120 has been injected with forged data, such as a false ARP cache 138 that identifies the IP/MAC address of terminal A 110 as the gateway, i.e. terminal A has assumed the identity of the gateway 108. Terminal B 114 assumes that this frame has been sent by a gateway 108 through the access point 112 and writes this false (poisoned) ARP cache 138 into its ARP cache 140. The infected terminal B will then send traffic 122 encrypted with its private key to the access point using the false address of the terminal A 110 as its destination address instead of the actual gateway 108. The access point handles this traffic normally assuming that terminal B wants to send data to that destination address, and the access point will forward this traffic 124 to the terminal A 110 using terminal A's private key. Terminal A can then simply decrypt the data from terminal B using its private key. After reading the data, terminal A could then resend 128 the same data through the actual gateway 108 so that terminal B never knows that its data has been intercepted.

In accordance with the present invention, in order to detect whether an attached terminal has a poisoned ARP cache, a processor of a network entity (i.e. access point 112) must first establish a known, authorized ARP cache 132 for the network that it can store in memory. The network entity can do this by simply storing a statically-configured ARP cache that is known in the network in its memory. Alternatively, a transceiver of the access point can sniff (read) a terminal's Dynamic Host Configuration Protocol (DHCP) handshake with the DHCP server 116, and the processor can store the cache given to the terminal in its memory. Still another possibility, is that the access point processor can obtain an authorized cache from a trusted wired port, since wired ports are unaffected by the Hole 196 flaw. Hole 196 only attacks wireless terminals, so it in of itself will not alter the ARP cache in the access point.

The processor of the network entity (e.g. access point 112) can then examine the destination IP and destination MAC address of every packet received by its transceiver from an attached terminal The processor can detect when the destination MAC address is incorrect by using the known, authorized ARP cache 132 stored in its memory. In effect, the processor needs to learn both an authorized ARP cache and have an idea of what the terminal's IP route table is in order to re-perform the IP route and ARP cache lookups the terminal did. In particular, the processor will take the destination IP/MAC address from the terminal, re-perform the same routing and ARP lookups done by the terminal, but using its known, authorized ARP cache 132, and see if it gets a different destination MAC address as a result. Specifically, the processor checks the destination IP and the destination MAC of the packets against a cache of addresses in the ARP cache 132, flags any mismatch, and returns a conflict indication to the processor. If the result is different, the processor of the access point knows that the ARP cache 140 of the indicated attached terminal has been compromised (i.e. poisoned).

Optionally, once ARP poisoning is detected (i.e. an incorrect destination address is detected), the access point can reverse the ARP poisoning by itself re-poisoning 130 the client with the correct, authorized ARP cache 132. Further, the access point can rewrite the correct the packet address over the false packet address using the known, good ARP table calculations, and then forward the packets onto the correct address. Further still, the access point can raise an alert with the system operator of the network.

Figure 2:
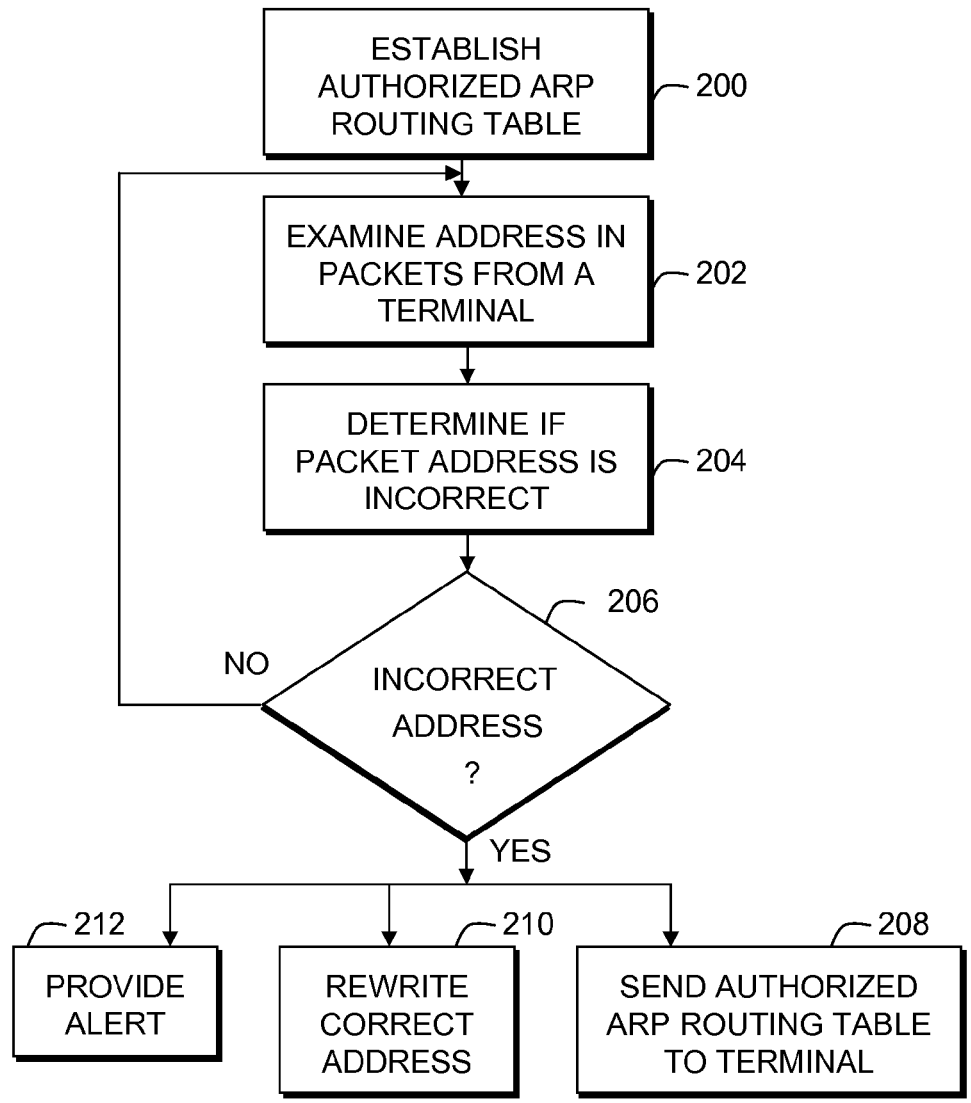
FIG. 2 is a flowchart of a method, in accordance with some embodiments of the present invention.

FIG. 2 illustrates a flowchart of a method for detecting an unauthorized change in an Address Resolution Protocol (ARP) cache in a terminal of a communication network. One step of the method includes establishing 200 an authorized ARP cache. This can be done by storing a known, authorized, statically-configured cache in the network entity (e.g. access point) memory. This can also be accomplished by sniffing (reading) a terminal's Dynamic Host Configuration Protocol (DHCP) handshake, and storing the cache given to the terminal in the network entity memory. This can also be accomplished by obtaining an authorized cache from a trusted wired port (since wired ports are not affected by the flaw.

Another step includes examining 202 packets from a terminal for a destination address. The destination address includes one or both of an Internet Protocol address and a Media Access Control address for the packet.

Another step includes determining 204 if the destination address is incorrect 206 by using the authorized ARP cache. In particular, this includes the network entity taking the destination IP, re-performing routing and ARP lookups using the authorized ARP cache to provide a resulting destination address, and determining if the resulting destination address is different from the destination address from the terminal.

If an incorrect destination address is detected 206 in the determining step 204, the method can include one or more of:

providing an alert 212, providing 208 the authorized ARP cache to the terminal, and rewriting 210 a correct destination address over the incorrect destination address. In this way, the packets can be sent on to the correct destination address, and the false ARP cache is overwritten (i.e. re-poisoned) with the correct, authorized ARP cache. If the destination address is correct 206 the method will continue monitoring more packets 202, 204 from terminals attached to the access point.

Advantageously, the apparatus and method described herein enables the detection of a poisoned ARP cache due to an unauthorized or rogue terminal that is attached to a communication network in order to help close the "Hole 196" flaw in WPA2. The present invention does not require that the terminal requires any new software. In addition, the present invention does not utilize any extra messaging overhead.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for detecting an unauthorized change in an Address Resolution Protocol (ARP) cache in a communication network, the method comprising:
   establishing an authorized ARP cache by obtaining the authorized ARP cache from a trusted wired port;
   a terminal performing routing and ARP lookups using a locally-stored ARP cache to provide a destination address;
   examining packets from the terminal to take the destination address;
   re-performing routing and ARP lookups using the authorized ARP cache to provide a resulting destination address; and
   determining if the resulting destination address is different from the destination address taken from the terminal packets, indicating that the locally-stored ARP cache is unauthorized.

2. The method of claim 1, wherein establishing includes storing a known, authorized, statically-configured ARP cache.

3. The method of claim 1, wherein establishing includes reading a terminal's Dynamic Host Configuration Protocol (DHCP) handshake, and storing the authorized cache in the locally-stored ARP cache of the terminal.

4. The method of claim 1, wherein the destination address in the examining step includes at least one of an Internet Protocol address and a Media Access Control address.

5. A method for detecting an unauthorized change in an Address Resolution Protocol (ARP) cache in a communication network, the method comprising:
- establishing an authorized ARP cache;
- a terminal performing routing and ARP lookups using a locally-stored ARP cache to provide a destination address;
- examining packets from the terminal to take the destination address;
- re-performing routing and ARP lookups using the authorized ARP cache to provide a resulting destination address; and
- determining if the resulting destination address is different from the destination address taken from the terminal packets, identifying an address of the terminal as a gateway, and indicating that the locally-stored ARP cache is unauthorized and that the terminal has falsely assumed the identity of the gateway.

6. The method of claim 1, further comprising providing an alert if an unauthorized ARP cache is indicated.

7. The method of claim 1, further comprising rewriting the correct destination address over the incorrect destination address in the packets if an incorrect destination address is detected in the determining step, and forwarding the packets onto the correct destination address.

8. A method for detecting an unauthorized change in an Address Resolution Protocol (ARP) cache in a communication network, the method comprising:
- establishing an authorized ARP cache;
- a terminal performing routing and ARP lookups using a locally-stored ARP cache to provide a destination address;
- examining packets from the terminal to take the destination address;
- re-performing routing and ARP lookups using the authorized ARP cache to provide a resulting destination address;
- determining if the resulting destination address is different from the destination address taken from the terminal packets, indicating that the locally-stored ARP cache is unauthorized; and
- providing the authorized ARP cache to the terminal to replace the terminal's locally-stored ARP cache if the locally-stored ARP cache is an unauthorized ARP cache as indicated in the determining step.

9. A network entity for detecting an unauthorized change in an Address Resolution Protocol (ARP) cache in a communication network, the network entity comprising:
- a transceiver;
- a memory; and
- a processor operable to establish an authorized ARP cache by obtaining the authorized ARP cache from a trusted wired port,
- examine packets received by the transceiver from a terminal that has performed routing and ARP lookups using its a locally-stored ARP cache to provide a destination address taken by the processor, re- perform routing and ARP lookups using the authorized ARP cache to provide a resulting destination address; and
- determine if the resulting destination address is different from the destination address taken from the terminal packets, indicating that the locally-stored ARP cache is unauthorized, whereupon providing an alert to the communication network.

10. The network entity of claim 9, wherein the network entity is an access point.

11. The network entity of claim 9, wherein the processor is operable to store a known, authorized, statically-configured ARP cache in the memory.

12. The network entity of claim 9, wherein the transceiver operates to read a terminal's Dynamic Host Configuration Protocol (DHCP) handshake, and the processor is operable to store the authorized cache in the locally-stored ARP cache of the terminal in the memory.

13. The network entity of claim 9, wherein the destination address includes at least one of an Internet Protocol address and a Media Access Control address.

14. The network entity of claim 9, wherein if the processor is operable to identify an address of the terminal as a gateway, this indicates that the terminal has falsely assumed the identity of the gateway.

15. The network entity of claim 9, wherein the processor is further operable to rewrite the correct destination address over the incorrect destination address in the packets if an incorrect destination address is detected, and forward the packets onto the correct destination address.

16. The network entity of claim 9, wherein the processor is further operable to provide the authorized ARP cache to the terminal to replace the terminal's locally-stored ARP cache if the locally-stored ARP cache is an unauthorized ARP cache.

* * * * *